United States Patent [19]

Eisman

[11] Patent Number: 5,133,843
[45] Date of Patent: Jul. 28, 1992

[54] METHOD FOR THE RECOVERY OF METALS FROM THE MEMBRANE OF ELECTROCHEMICAL CELLS

[75] Inventor: Glenn A. Eisman, Midland, Mich.

[73] Assignee: The Dow Chemical Company, Midland, Mich.

[21] Appl. No.: 580,231

[22] Filed: Sep. 10, 1990

[51] Int. Cl.$^5$ ............................ C08J 7/00; C25C 1/20
[52] U.S. Cl. ................................ 204/105 R; 204/109; 204/111; 423/22; 210/638; 210/670; 521/26; 521/27
[58] Field of Search ................ 423/22; 210/638, 670; 521/26, 27; 204/105 R

[56] References Cited

U.S. PATENT DOCUMENTS 4,367,147  1/1983  Asami et al. ................ 204/182.4
4,526,904  7/1985  Kishida et al. ................ 521/26

OTHER PUBLICATIONS

Treatise on Inorganic Chemistry-H. Remy, vol. II--1956.

*Primary Examiner*—John Niebling
*Assistant Examiner*—David G. Ryser

[57] ABSTRACT

A method for rejuvenating a membrane or diaphragm from an electrochemical cell which comprises the steps of treating the membrane or disphragm with an inorganic acid at an elevated temperature so as to dissolve metallic particles and then optionally treating the membrane or diaphragm with a basic solution. Metals dissolved in the acid solution can be recovered by conventional methods.

13 Claims, No Drawings

METHOD FOR THE RECOVERY OF METALS FROM THE MEMBRANE OF ELECTROCHEMICAL CELLS

FIELD OF THE INVENTION

The present invention relates to a method for recovering catalyst metals which are found in and on the membranes or diaphragms of electrochemical cells, and to the regeneration of the membranes or diaphragms.

The invention further provides for recovering metals such as transition metals from the membrane or diaphragm separators of chloralkali cells, fuel cells or water electrolyzers, and for the regeneration of the membranes or diaphragms for further use in such systems.

BACKGROUND OF THE INVENTION

A typical electrolyte alkali metal halide cell is an enclosed container which is physically partitioned into at least two distinct regions by means of a permeable intermediate barrier or cell separator, such as a diaphragm or synthetic microporous separator. During the electrolysis of an alkali metal halide solution, hydrogen and alkali metal hydroxide are formed at the cathode, while chlorine and oxygen are formed at the anode. When the alkali metal is sodium, the electrolytic solution in the cathode compartment, i.e. the catholyte may contain approximately 12-17% NaOH, 15-20% NaCl and negligible, e.g. about 10 ppm NaOCl. However, when the current flow to the cell is interrupted, such as when a cell is subjected to routine maintenance during a shutdown period, the concentration of sodium hypochlorite in the catholyte cell increases significantly up to 2 gms/liter or more. Such concentrations of sodium hypochlorite can have an immediate adverse effect on the transition metals contained in the cathode, causing such metals to dissolve in the solution and ultimately leading to the failure of the cathode coating. In addition, these metals will also deposit within the diaphragm or membrane. These two events will cause a deterioration in cathode and membrane performance. That is, there is a loss of catalyst from the cathode or a higher hydrogen overvoltage and therefore a loss of cell voltage performance caused by the corrosion. In addition, there is a higher cell voltage and a lower current efficiency caused by the deposition of the metal in the membrane or diaphragm.

In the start up of the multi-compartment cell there is generally a long period of time before the cell is operational. That is, during the period in which the cell is being charged with aqueous solution and there is no current flow, deposition of metals and corrosion occurs. The metals which are generally deposited are the transition metals.

The rapid increase in sodium hypochlorite concentration in the catholyte of a chlor alkali cell which occurs during periods of current interruption is caused by the convection flow and diffusion of hypochlorite ions from the anolyte. At the cathode, the sodium hypochlorite is reduced to sodium chloride and water as follows:

$$NaOCl + 2H^+ + 2e^- \rightarrow NaCl + H_2O$$

The corresponding oxidation of the cathode transition metal, illustrated below by nickel, can be designated as follows:

$$Ni \rightarrow Ni^{++} + 2e^-$$

The overall reaction can thus be designated as:

$$Ni + NaOCl + 2H^+ \rightarrow Ni^{++} + NaCl + H_2O$$

The nickel in the cathode is thus ionized and becomes soluble in the catholyte causing dissolution of the coating.

Various coating materials have been suggested to improve the hydrogen overvoltage characteristics of electrolytic cell cathodes in an economically viable manner. A significant number of prior art coatings have included transition metals other than iron or steel, such as ruthenium, cobalt and nickel, or mixtures, alloys or intermetallic compounds of these metals with various other metals, and their oxides. Such metals during shutdown are deposited on the membrane or diaphragm.

The recovery of the metals in recent years has become important as a result of the high prices for catalyst materials and the increase in cost of such metals. It is further important as a cost factor to be able to reuse the membrane in cases where maintenance is performed before the normal operational life of the membrane has expired.

U.S. Pat. No. 4,055,476 discloses the continuous addition of nickel-based catalysts to an electrolytic diaphragm cell brine feed to prevent the formation of chlorates in the cell by decomposing sodium hypochlorite. Other reagents which are disclosed as being useful for this purpose include hydrochloric acid, sodium tetrasulfide, and various nickel and cobalt compounds. However, this patent does not recognize the utility or rejuvenating the diaphragm as a result of metal contamination during periods of current interruption or cell shutdown.

U.S. Pat. No. 4,680,098 to Yuehsiung discloses an electrodialysis process for extracting cobalt and manganese from catalysts recovered from a system for preparing trimellitic anhydride. Such a system can also be utilized for the extraction of cobalt and manganese from solutions obtained during the rejuvenation of the membranes in the present invention.

It is therefore an object of the invention to provide a method for extracting catalyst metals from the membrane of an electrochemical cell.

It is a further object of the invention to provide a process for the rejuvenation of a membrane separator of an electrochemical cell.

It is still further object of the invention to improve the performance of a chlor alkali cell after a shutdown period by the rejuvenation of its membrane separator.

SUMMARY OF THE INVENTION

The present invention provides a method for the rejuvenation of the membranes or diaphragms of electrochemical cells and for the recovering of metals, particularly catalyst metals, therefrom. More particularly, the invention provides for the removal of metals from an ion exchange membrane or diaphragm by treatment with an inorganic acid selected from the group consisting of sulfuric acid, nitric acid, hydrochloric acid, and mixtures thereof, so as to remove the metallic catalyst from the membrane or diaphragm. Preferably, the treatment with the acid is performed at elevated temperatures. The metals dissolved in the acid can be recovered by any of several conventional methods.

The invention further provides for the continued treatment of the membrane or diaphragm particularly, a membrane for reuse in a chlor alkali cell by the steps of treating the membrane or diaphragm with a basic solution, optionally, retreating the membrane with an inorganic acid and then applying an electrode assembly on the acid treated membrane or diaphragm.

DESCRIPTION OF THE PREFERRED EMBODIMENTS

The objects of the present invention are achieved by treatment of a membrane or diaphragm removed from an electrochemical cell with an inorganic acid, particularly, hydrochloric acid or a mixture of hydrochloric and nitric acid, preferably in a ratio of 3:1, at a temperature between about 35° to 70° C. for a period of time to convert the metals on the diaphragm or membrane to their soluble acid salt. The period can be for about 2 to 20 hours, commonly about 16 hours, depending upon the length of membrane service.

When the membrane is from an electrochemical cell wherein an electrode assembly is bonded onto the membrane, such as from a chlor alkali cell, the acid treatment is generally sufficient to remove the electrode assembly from the membrane. The electrode assembly is generally bound to the membrane in combination with an inert polymeric material, such as polytetrafluoroethylene (TEFLON).

The acid solution containing the dissolved metal salts can be processed in many different ways. For example, if the catalyst was platinum black or platinized carbon, the platinum would be converted by hydrochloric acid to a chlorinated platinic acid complex such as hexachloroplatinic acid. The hexachloroplatinic acid can be reduced and the resultant product precipitated and collected.

Alternatively, the dissolved metals can be electrochemically extracted from the acidic solution according to a process disclosed in U.S. Pat. No. 4,680,098, which is herein incorporated by reference, or collected by electroplating.

The membrane from the acid bath is prepared for use in a zero gap or narrow gap chlor alkali cell by soaking in a basic solution for a period of time at an elevated temperature. Typically, a membrane for a chlor alkali cell, is soaked in a concentrated solution of sodium hydroxide or some other alkali metal hydroxide for about 16 hours at a temperature of about 50° C. After the treatment with the base, the membrane is dried and placed into operation in the cell.

For proton transporting processes such as fuel cells and water electrolyzers, the membrane from the soak with the base can be retreated with a solution of the inorganic acid and then rebonded to a suitable electrode assembly.

A cathode assembly for use in a chlor alkali cell can be formed with a catalyst support and an aqueous dispersion of polytetrafluorethylene and a platinum catalyst, for example, platinum black on a carbon paper, drying the assembly, and then laminating the electrode assembly onto the membrane with suitable heat and pressure.

Membranes suitable for use in the instant invention are of several types, which now are commercially available, and are generally fluorinated polymeric materials which have surface modifications necessary to perform the ion-exchange function. One presently preferred material is a perfluorinated copolymer having pendent cation exchange functional groups. These perfluorocarbons are a copolymer of at least two monomers with one monomer being selected from a group including vinyl fluoride, hexafluoropropylene, vinylidene fluoride, trifuloroethylene, chlorotrifluoroethylene, perfluoro (alkylvinyl ether) tetrafluoroethylene and mixtures thereof.

The second monomer often is selected from a group of monomers usually containing an-$SO_2F$ or sulfonyl fluoride pendant group. Examples of such second monomers can be generically represented by the formula $CF_2=CFR_1SO_2F$. $R_1$ in the generic formula is a bifunctional perfluorinated radical comprising generally 1 to 8 carbon atoms but upon occasion as many as 25 carbon atoms. One restraint upon the generic formula is a general requirement for the presence of at least one fluorine atom on the carbon atom adjacent the —$SO_2F$ group, particularly where the functional group exists as the —(—$SO_2NH$)mQ form. In this form, Q can be hydrogen or an alkali or alkaline earth metal cation and m is the valence of Q. The $R_1$ generic formula portion can be of any suitable or conventional configuration, but it has been found preferably that the vinyl radical comonomer join the $R_1$ group through an ether linkage.

Such perfluorocarbons, generally are available commercially such a through E. I. duPont & Company, their products being known generally under the trademark NAFION ®. Perfluorocarbon copolymers containing a perfluoro (3,6 diaxoa-4-methyl-7-octenesulfonyl fluoride) comonomer have found particular acceptance in chlorine cells. Where sodium chloride brine is utilized for making chloralkali products from an electrochemical cell, it has been found advantageous to employ membranes having their preponderant bulk comprised of perfluorocarbon copolymer having pendant sulfonyl fluoride derived functional groups, and a relatively thin layer of perfluorocarbon copolymer having carbonyl fluoride derived functional groups adjacent one membrane surface. It is presently preferred to have these membranes further modified with inorganic surface treatments which impregnate the surface of said membranes with metallic materials such as, i.e. $ZrO_2$, and $TiO_2$. This modification is believed to help prevent the problem of gas bubble buildup along the membrane electrode interface. By removing this problem the cell is able to operate more efficiently. A more detailed description of this type of membrane modification can be found in U.S. application Ser. No. 277,918, filed Oct. 22, 1982, issuing as U.S. Pat. No. 4,421,579, in the name of Covitch et al. and incorporated herein by reference.

Suitable anodes which may be used or bonded to the membrane include anodes of graphite alone or with a foraminous valve metal such as titanium or tantalum having an electrochemically active coating over at least a portion of the anode surface. Suitable coatings include those of a platinum group metal, platinum group metal oxide, an alloy of a platinum group metal or mixtures thereof. The term "platinum group metal" means an element of the group consisting of ruthenium, rhodium, platinum, palladium, osmium and iridium. Coatings containing mixtures of valve metal oxides such as ruthenium oxide are described in U.S. Pat. No. 3,632,498, issued to H. B. Beer on Jan. 4, 1972. Other anodes which may be employed include those described in U.S. Pat. No. 4,333,805, issued Jun. 8, 1982, to C. R. Davidson et al.; U.S. Pat. No. 4,240,887, issued Dec. 23, 1980, to D. E. Hall; U.S. Pat. No. 4,200,515, issued Apr. 29, 1980, to E. E. Hall et al.; U.S. Pat. No. 4,042,484, issued Aug. 16, 1977, to G. Thiele et al.; U.S. Pat. No. 3,962,068, issued Jun. 8, 1976, to Zoellner et al.; and U.S. Pat. No. 3,992,280, issued Nov. 16, 1976, to Zoellner et al.

Suitable cathodes which may be used alone or bonded to the membrane include electrode structures such as a fine metal screen or mesh and carbon paper or mats. The cathodes advantageously have at least one catalytically active surface including, for example, porous surfaces such as those of a Raney metal (e.g. nickel or cobalt) or permeable catalytic electrodes such as those having cathode catalyst materials attached to or imbedded in the membrane or incorporated in a polymer or plastic matrix. Cathodes which can be employed in the novel method of the present invention include those, for example, described in U.S. Pat. No. 4,116,804, issued Sep. 26, 1978, to C. Needes; U.S. Pat. No. 4,184,941, issued Jan. 28, 1980 to W. W. Carlin; U.S. Pat. No. 4,248,680, issued Feb. 3, 1981, to W. W. Carlin et al.; U.S. Pat. No. 4,135,995, issued Jun. 23, 1979, to C. N. Welch; U.S. Pat. No. 4,224,121, issued Sep. 23, 1980, to R. W. Dempsey et al.; and U.S. Pat. No. 4,033,837, issued Jul. 5, 1977, to H. C. Kuo et al.

Other suitable cathodes include highly porous reticulate cathodes comprised of electroconductive filaments and having a means of applying an electrical potential to the filaments. The term "filaments" includes fiber, threads or fibrils. The filaments may be those of the electroconductive metals themselves, for example, nickel, titanium, platinum, or steel, or of materials which can be coated with an electroconductive metal. Any materials which can be coated with these electroconductive metals may be used including, for example, metals such as silver, titanium, or copper, plastics such a polyarylene sulfides, polyolefins produced from olefins having 2 to about 6 carbon atoms and their chloro- and fluoro-derivatives, nylon, melamine resins, acrylonitrile-butadiene-styrene (ABS) copolymers, and mixtures thereof.

Where filaments can be coated and are nonconductive to electricity, it may be necessary to sensitize the filaments by applying a metal such as silver, nickel, aluminum, palladium or their alloys by known procedures. The electroconductive metals are then deposited on the sensitized filaments.

The novel method of the present invention is illustrated in the following Example without any intention of being limited thereby.

EXAMPLE

A. A NAFION membrane/cathode assembly from a chloralkali process is soaked in an aqua regia solution (HCl—HNO$_3$ 3:1) at a temperature of 50° C. for 2 hours. The membrane is then removed and washed with deionized water. The acid solution is then filtered and the metals removed from the solution by electroplating.

B. The membrane from part A, if it is to be used in a chloralkali system, is then soaked for 16 hours in a 40% sodium hydroxide solution at a temperature of 50° C. The membrane is removed from the solution and washed with deionized water. The membrane in this form can be dried and used in a zero gap chlor alkali cell.

C. The membrane from part A, if it is to be used in a fuel cell system, is prepared for bonding with an electrode assembly by soaking in concentrated hydrochloric acid for 2 hours at 50° C. and then rinsed repeatedly with deionized water.

D. A cathode assembly comprising carbon fiber paper with a dispersion of polytetrafluoroethylene and platinum black was prepared. The electrodes were bonded to the membrane using a heat/pressure cycle. The package was placed in a flat platen press and a pressure of 500 psi was applied with heat to 175° C.

The prepared membrane/cathode was suitable for use in a fuel cell.

What is claimed:

1. A method for rejuvenating a membrane or diaphragm having a metallic coating selected from the group consisting of a platinum group metal, platinum group metal oxide, an alloy of a platinum group metal and mixtures thereof from an electrochemical cell which comprises the steps of treating the membrane or diaphragm with an inorganic acid solution of aqua regia at a temperature of about 35° to 70° C. so as to dissolve metallic particles and then treating the membrane or diaphragm with a basic solution.

2. The method of claim 1 where said base is sodium hydroxide.

3. The method of claim 1 including the step of further treating the base treated diaphragm or membrane with an inorganic acid.

4. The method of claim 1 including the steps of further treating the diaphragm or membrane with an inorganic acid after treatment with the basic solution and then applying to said diaphragm or membrane an electrode assembly.

5. The method of claim 4 wherein said electrode is a cathode.

6. The method of claim 1 wherein said cell is a chloralkali cell.

7. The method of claim 1 wherein said coating comprises platinum and platinum oxide.

8. A method of rejuvenating a membrane or diaphragm having a metallic coating selected from the group consisting of a platinum group metal, platinum group metal oxide, an alloy of a platinum group metal and mixtures thereof from an electrochemical cell and recovering metallic particles therefrom comprising the steps of treating said membrane or diaphragm with an inorganic acid solution of aqua regia at temperatures of about 35° to 70° C. so as to dissolve metallic particles, separating said acid solution with dissolved particles from said diaphragm or membrane, filtering said acid solution and then recovering metallic particles from said acid solution.

9. The method of claim 8 wherein said metallic particles are recovered from said acid solution by electrochemical separation.

10. The method of claim 8 wherein said electrochemical cell is a chloralkali cell.

11. The method of claim 8 wherein said electrochemical cell is a fuel cell.

12. The method of claim 8 wherein said electrochemical cell is a water electrolyzer.

13. The method of claim 8 wherein said particles recovered are platinum.

* * * * *